Dec. 27, 1960 A. N. ORMOND 2,966,049
UNIVERSAL FLEXURE JOINT
Filed Sept. 29, 1959
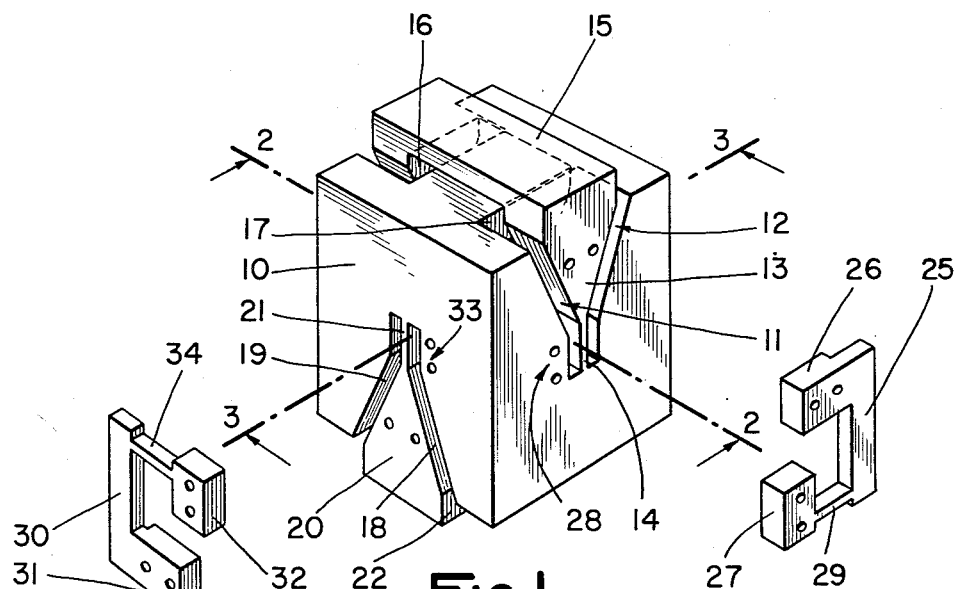
Fig.1.
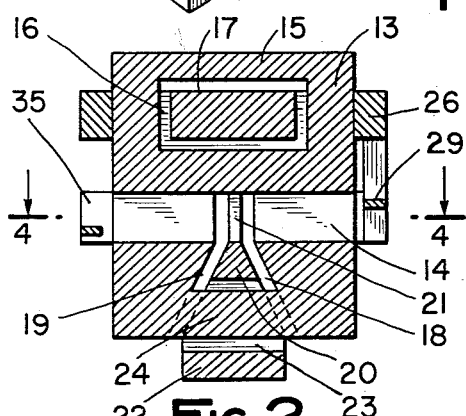
Fig.2.
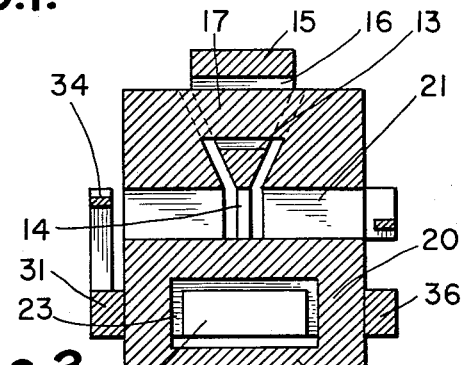
Fig.3.
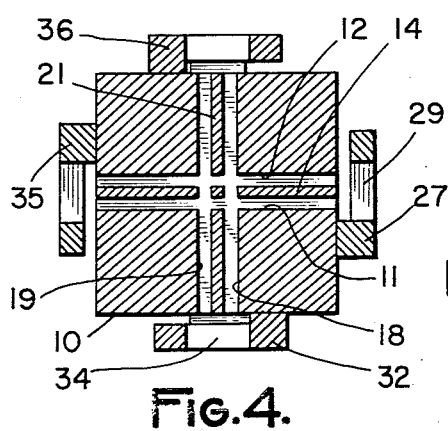
Fig.4.
Fig.5.
INVENTOR.
ALFRED N. ORMOND
BY
Elliott & Pastoriza
ATTORNEYS

United States Patent Office 2,966,049
Patented Dec. 27, 1960

2,966,049

UNIVERSAL FLEXURE JOINT

Alfred N. Ormond, 9107 5th Ave., Inglewood, Calif.

Filed Sept. 29, 1959, Ser. No. 843,170

5 Claims. (Cl. 64—15)

This invention relates generally to flexure joints, and more particularly to an improved universal flexure joint.

To eliminate the many variables associated with knife edges, bearings, and ball and socket joints, designers and users of quality load measuring systems are turning to the use of flexure joints or pivots in structures which require bending and rotational freedom through small angles. Flexure joints have long been recognized as constituting almost nearly perfect pivots. Their chief advantage resides in the elimination of friction, backlash, wear, and other variables associated with coupling design. In balance systems employing force multiplying members for example, greater accuracy is assured by the use of flexure joints as compared to conventional pivoted structures in that any looseness in pivots is multiplied in the overall system.

In using flexure joints in laboratory measuring instruments, the principals involved are not difficult to apply. On the other hand, in attempting to employ flexures in relatively large installations or mounting structures, the required increased strength in the units necessitates unique design features. For example, while a straight cantilevered rod meets to a certain extent the requirements of a universal flexure in that movement in all directions is possible, the rod itself is sensative to torsion and shear forces between the connected members; moreover if a proper degree of flexure amplitude is to result, the rod is often too weak to withstand compression forces. If a single flexure web structure is employed, then motion is limited in the two directions about the medial line of the web itself. Two webs at right angles to each other provide a partial solution but the centers of rotation about the respective webs are not coincident and thus the universal movement does not take place about a single point as for example, characterizes the ball and socket joint.

With the foregoing in mind, it is a general object of the present invention to provide a universal type flexure of high strength which will enable omni-directional movements within desired angles.

More particularly, it is an object to provide an improved universal flexure unit in which flexure movement in all directions takes place about a single central point and yet which system can accommodate large tension, compression, shear, or torsional forces without appreciably affecting the operating portions of the device in flexure to the end that great accuracy can be provided in relatively large mounting installations and test stands.

Briefly, these and other objects and advantages of this invention are attained by providing a universal flexure in the form of an integral block having first and second pairs of slots cut in opposite surfaces of the block at right angles to each other. The slots are cut to a depth greater than half the separation of the opposite surfaces so that the inner ends of the slots intersect to define first and second flexure webs. The medial lines of these webs are co-planer and intersect each other at right angles at substantially the center of the block. As a consequence, the opposite block portions between the slots of the first and second pairs may be flexed in any direction with respect to each other. The provision of webs as the flexure elements, on the other hand, insures great strength with respect to compression and tension forces.

The invention also includes side web structures in which side webs are disposed at right angles to the first and second flexure webs with their ends secured to the opposite movable portions of the blocks. By this arrangement, the side webs will inhibit shear and torsional forces applied to opposite ends of the block from appreciably affecting the main flexure webs. In addition, the side web structures confine flexure bending of the first and second flexure webs about their medial lines.

A better understanding of the universal flexure joint will be had by referring to a preferred embodiment thereof as schematically illustrated in the accompanying drawings, in which:

Figure 1 is a perspective view partly exploded showing the universal flexure joint;

Figure 2 is a cross section taken in the direction of the arrows 2—2 of Figure 1 but showing the exploded portions of Figure 1 in their normal position;

Figure 3 is another cross section similar to Figure 2 taken in the direction of the arrows 3—3 of Figure 1;

Figure 4 is a cross section taken in the direction of the arrows 4—4 of Figure 2; and Figure 5 is a front elevational view of the structure of Figure 1 with the exploded portions in place.

Referring to Figure 1, the universal flexure joint comprises an integral block 10 having a first pair of angulated slots 11 and 12 cut through the upper half potrion of the block to define a first Y-shaped body 13. The sides of this Y-shaped body converge downwardly towards each other and then extend parallel to each other to define a first flexure web 14.

The upper end 15 of the first Y-shaped block 13 includes an upper recessed potrion cut tranversally therethrough as indicated at 16. Upper portions of the block 10 on opposite sides of the slots 11 and 12 are integrally connected as indicated by the bridge 17 passing through the recess 16.

The lower half portion of the block 10 similarly includes a second pair of angulated slots 18 and 19 passing through the block in a direction at 90 degrees from the first angulated slots and defining a second inverted Y-shaped body 20. As shown, the sides of the inverted Y-shaped body 20 converge upwardly towards each other and then extend parallel to define a second flexure web 21. The medial lines of the first and second flexure webs 14 and 21 are co-planer and intersect at right angles to each other at subtsantially the center of the block 10.

The lowermost end portion 22 of the inverted Y-shaped block 20, as in the case of the upper portion 16, of the first Y-shaped block 13, includes a lower transverse recessed portion 23 as can best be seen in the cross section of Figure 2. The lower portions of the block 10 on opposite sides of the angulated slots 18 and 19 are integrally connected through the recessed portion 23 as indicated by the bridge 24 in Figure 2. The structure is symmetrical to the upper Y-shaped block except that the inverted lower Y-shaped block is oriented at right angles thereto as shown.

The described structure can best be understood by referring in detail to Figures 2, 3, and 4. In Figure 2, the cross section is taken along the dashed line 2—2 of Figure 1 just in front of the first flexure web 14 and in a plane including the medial line of the web. Similarly, Figure 3 illustrates the cross section just in front of the second flexure web 21 in the same plane as the medial line thereof. The various recessed portions on the upper and lower Y-shaped bodies and the corresponding block structure passing through these recesses to form the bridges 17 and 24 are also illustrated clearly in Figures 2 and 3.

In the cross sectional plan view of Figure 4, the orientation of the webs 14 and 21 will be evident as will also be the intersection of the inner ends of the parallel portions of the pairs of slots 11 and 12 and 18 and 19.

With the foregoing described cuts defining the first and second flexure webs, the first Y-shaped body 13 can be moved relative to the second inverted Y-shaped body 20 in any direction from a vertical axis, the degree of movement being limited solely by the width of the slots. Thus, movement on either side of the vertical axis with respect to the plane of the drawing of Figure 2 would take place about the flexure web 21 while movement on either side of the vertical axis with respect to the plane of the drawing of Figure 3 would take place about the flexure web 14. Note that such movement will always be about a single central point. Movement in planes at angles between the two planes of Figures 2 and 3 will result in flexural movement of both of the webs.

As a consequence of the longitudinal web structure, the block can accommodate large compression and tension loads. This is because the webs themselves extend through a considerable length of the block thus providing a relatively large volume of material even though remaining relatively thin to permit easy flexing in any particular direction.

In order to insure flexing of the first and second webs about their medial lines and also to render the device relatively insensitive to shear and torsion forces applied between the body members 16 and 20, side web structures are provided. Referring again to Figure 1, for example, there is shown a side web structure 25 provided with end fastening means 26 and 27 for direct securement to the first Y-shaped body 16 and integral block portion 10 as at 28. A horizontal side web 29 extends between these fastening means at right angles to the web 14 and in the plane of its median line.

Similarly, there is provided a side web structure 30 having end fastenings 31 and 32 for direct securement to the inverted Y-shaped body 20 and integral block 10 as at 33. A second horizontal web 34 extends perpendicularly to the web 21 between the fastening means 31 and 32. The far sides of the integral block 10 of Figure 1 (not visible) include similar side flexure structures shown in Figure 4 at 35 and 36.

With the side web structures secured in place, flexing of the first and second webs will be constrained to their medial lines which medial lines lie in the horizontal plane of the side web structures. Further, torsion and shear forces will be borne by the side web structures rather than the principal flexure webs themselves and thus will not appreciably affect the principal flexure webs.

In the operation of the universal flexure as described, the upper Y-shaped block 16 is bolted or otherwise secured to one member and the lower inverted Y-shaped block 20 in turn secured to a stationary base or other member with respect to which the first member moves. The first member secured to the first Y-shaped block 13 can then execute movements omni-directionally through small angles with substantially zero friction, backlash, and wear. Moreover, such movement will be with respect to a single central point. There is thus provided a universal flexure of high strength and extreme accuracy which may be substituted for conventional ball and socket joints.

Modifications that fall clearly within the scope and spirit of this invention will occur to those skilled in the art. The universal flexure is therefore not to be thought of as limited to the exact embodiment set forth merely for illustrative purposes.

What is claimed is:

1. A universal flexure joint comprising: a block having first and second pairs of slots cut in opposite surfaces at right angles to each other to a depth greater than half the separation of said opposite surfaces so that the inner ends of said slots intersect to define first and second flexure webs, the medial lines thereof being co-planar and intersecting each other at right angles at substantially the center of said block, whereby opposite block portions between the slots of said first and second pair may be flexed omni-directionally with respect to each other.

2. The subject matter of claim 1, including at least two co-planar side webs disposed at right angles to said first and second flexure webs respectively and having their ends secured to said block portions and the remaining adjacent portions of said block.

3. A universal flexure joint comprising: an integral block having first angulated slots cut through an upper half portion thereof to define a first Y-shaped body, the sides of which converge downwardly towards each other and then extend parallel to each other to define a first flexure web, said integral block having second angulated slots cut through the lower half portion thereof in a direction at right angles to said first angulated slots to define a second inverted Y-shaped body, the sides of which converge upwardly towards each other and then extend parallel to each other to define a second flexure web, the medial lines of said first and second flexure webs being co-planar and perpendicular to each other to intersect at substantially the center of said integral block whereby flexure movements of said first Y-shaped body with respect to said second inverted Y-shaped body can take place omni-directionally and to a degree with respect to the normal to the plane of said medial lines limited only by the width of said slots.

4. The subject matter of claim 3, in which said first Y-shaped body has an upper recessed portion cut transversely therethrough, the upper half portions of said block on opposite sides of said first angulated slots being integrally connected through said upper recessed portion, and said second inverted Y-shaped body has a lower recessed portion cut transversely therethrough, the lower half portions of said block on opposite sides of said second angulated slots being integrally connected through said lower recessed portion.

5. The subject matter of claim 4, including first and second pairs of side web structures secured to sides of said block respectively between said first Y-shaped body and said block and said second Y-shaped body and said block, said first and second pairs of side web structures including side webs all lying in the plane of and having medial lines respectively perpendicular to the medial lines of said first and second flexure webs, whereby flexure movements of said first and second flexure webs take place about their respective medial lines and torsional and shear forces applied between said first Y-shaped body and said second inverted Y-shaped body are borne by said web structures.

References Cited in the file of this patent
UNITED STATES PATENTS

| | | |
|---|---|---|
| 1,557,958 | Anderson | Oct. 20, 1925 |
| 2,475,010 | Chilton | July 5, 1949 |
| 2,793,028 | Wheeler | May 21, 1957 |
| 2,860,495 | Stark | Nov. 18, 1958 |